US012400525B1

(12) United States Patent
Mitchell et al.

(10) Patent No.: US 12,400,525 B1
(45) Date of Patent: Aug. 26, 2025

(54) DETECTION OF PERIPHERAL DEVICE MANIPULATION

(71) Applicant: NCR Atleos Corporation, Atlanta, GA (US)

(72) Inventors: Graeme Mitchell, Dundee (GB); Alexander William Whytock, Perthshire (GB); Conor Michael Fyfe, Carnoustie (GB); Shannon McGrath, Perth (GB)

( * ) Notice: Subject to any disclaimer, the term of this patent is extended or adjusted under 35 U.S.C. 154(b) by 10 days.

(21) Appl. No.: 18/589,133

(22) Filed: Feb. 27, 2024

(51) Int. Cl.
*G07F 19/00* (2006.01)

(52) U.S. Cl.
CPC .................................. *G07F 19/207* (2013.01)

(58) Field of Classification Search
CPC ..... G07F 19/20; G07F 19/207; G07F 19/2055
See application file for complete search history.

(56) References Cited

U.S. PATENT DOCUMENTS 7,389,914 B1 6/2008 Enright et al.
7,458,516 B2 * 12/2008 Masterton ............ G06K 7/0013 235/479
11,790,189 B1 10/2023 Whytock
2015/0302707 A1 * 10/2015 Wiesinger ............ G06K 7/0056 235/440
2018/0040206 A1 2/2018 Wiesinger et al.
2024/0054300 A1 2/2024 Takeda et al.

FOREIGN PATENT DOCUMENTS

KR 101830186 2/2018

OTHER PUBLICATIONS

Extended European Search Report for corresponding European Patent Application No. 24204685.2 dated Mar. 18, 2025;.

* cited by examiner

*Primary Examiner* — Laura A Gudorf
(74) *Attorney, Agent, or Firm* — Notaro, Michalos & Zaccaria P.C.; John S. Economou

(57) ABSTRACT

A computer-implemented method and transaction terminal is disclosed. The method comprises capturing, by an imaging device, a first image of an internal region of an apparent peripheral device of the transaction terminal, calculating, by a processor of a transaction terminal, a first amount of change between the first image and a baseline image of the internal region, capturing, by the imaging device, at least one further image of the internal region, for each further image, calculating, by the processor, a second amount of change between the further image and a respective baseline image of the internal region, and when at least two consecutive values of the first and/or second amount of change are below a predefined value, determining that the imaging device is in a dummy peripheral device to prevent detection of a foreign object in an active peripheral device of the transaction terminal.

19 Claims, 11 Drawing Sheets

800

840

830

820

810

DETECTION OF PERIPHERAL DEVICE MANIPULATION

FIELD OF THE INVENTION

The present invention relates to a method for detecting that an imaging device of a peripheral device of a transaction terminal has been removed from an active peripheral device on the transaction terminal and instead been placed into a dummy peripheral device to prevent detection of a foreign object in the active peripheral device. The present invention also relates to a peripheral device and transaction terminal configured to perform the method. In particular, but not exclusively, the present invention relates to a methodology in which a history of percentage of change/difference between images of an internal region of a peripheral device and a respective baseline image of the internal region is analysed to determine whether little or no change is present across multiple images indicating that the imaging device may have been installed in a dummy peripheral device to trick the active peripheral device into believing that no foreign object is present within it.

BACKGROUND

In a banking or retail environment, it is well known that transaction terminals can be used to perform transactions by customers. For example, Automated Teller Machines (ATMs), Point of Sale (POS) terminals, Self-Service Terminals (SSTs), kiosks and the like are used by customers to perform transactions.

As these terminals are not always continuously monitored by staff or security services, nefarious parties can gain access to these terminals and attempt to modify the terminals for financial reward. For example, these parties may place foreign objects within the terminal so that they can gain access to confidential customer information or information about what is inside a terminal. One example of such a foreign object is a card skimmer. A card skimmer is a very thin and small electronic device that is inserted by a thief into the card slot of a card reader for the terminal. The skimmer is designed to align with a read head of a magnetic read interface for the card reader to steal customer card information. Payment card skimmers are a substantial problem in this industry especially since more and more transaction terminals are self-service where the customer inserts a card, performs the transaction and inserts a payment card for self-pay to complete the transaction.

Most attempts to thwart skimmers have been directed to adding hardware or rearranging the electromechanical components of the card reader itself. But this is expensive and labour intensive requiring each existing card reader of each terminal to be swapped out with a redesigned or updated card reader. Furthermore, most hardware-based solutions have been directed to adding sensors into the path of the card transport of the card readers. When a transaction is not being performed at the terminal if the sensor reports the presence of an obstruction, this is a pretty good indication that a skimmer is present, and the card reader is disabled on the terminal. However, thieves have just redesigned the layout and size of their skimmers so as to avoid the locations within the card reader of the sensors, which renders the hardware redesign for the reader useless. The present inventors have devised a methodology for using image analysis to detect the presence of foreign objects such as skimmers in peripheral devices. However, they have recognised that imaging devices may sometimes be vulnerable to an attack whereby the imaging device is removed from the active peripheral device and placed in a dummy peripheral device to make it seem as though no foreign object is present when performing image analysis (as the imaging device is viewing the dummy device where no foreign object is present). This would allow thieves to steal card information.

SUMMARY

It is an aim of the present invention to at least partly mitigate one or more of the above-mentioned problems.

It is an aim of certain embodiments of the present invention to help automatically detect that an imaging device has been removed from a peripheral device of a terminal and placed into a dummy device.

It is an aim of certain embodiments of the present invention to help ensure that a nefarious party cannot take advantage of a peripheral device that is using image analysis to detect foreign objects present that may be present within it.

It is an aim of certain embodiments of the present invention to help provide a methodology for detecting unauthorised manipulation of a peripheral device (e.g., removal of an imaging device) by a criminal party.

It is an aim of certain embodiments of the present invention to help analyse a total amount of change between images captured of an internal region of a peripheral device to determine whether there is little to no change indicating that the imaging device may be in a dummy device.

According to a first aspect of the present invention there is provided a computer-implemented method for determining that an imaging device for a peripheral device of a transaction terminal is in a dummy peripheral device to prevent detection of a foreign object in an active peripheral device of the transaction terminal, comprising the steps of:

- capturing, by an imaging device, a first image of an internal region of an apparent peripheral device of the transaction terminal;
- calculating, by a processor of a transaction terminal, a first amount of change between the first image and a baseline image of the internal region;
- capturing, by the imaging device, at least one further image of the internal region;
- for each further image, calculating, by the processor, a second amount of change between the further image and a respective baseline image of the internal region; and
- when at least two consecutive values of the first and/or second amount of change are below a predefined value, determining that the imaging device is in a dummy peripheral device to prevent detection of a foreign object in an active peripheral device of the transaction terminal.

Aptly, the method further comprising:

- determining, by the processor, that the imaging device is in the dummy peripheral device when at least two consecutive values of the first and/or second amount of change are zero.

Aptly, the method further comprising:

- calculating, by the processor, the first amount of change as an overall percentage change between the first image and the baseline image; and
- calculating, by the processor, the second amount of change as an overall percentage change between each further image and each respective baseline image.

Aptly, the method further comprising:

determining, by the processor, that the imaging device is in the dummy peripheral device when at least five consecutive values of the first and/or second amount of change are below the predefined value.

Aptly, the method further comprising:

after capturing the first image, determining, by the processor, that the foreign object is not present in the first image by comparing the first image with the baseline image.

Aptly, the method further comprising:

after capturing each further image, determining, by the processor, that the foreign object is not present in the further image by comparing the further image with the respective baseline image.

Aptly, whereby comparing comprises:

calculating, by the processor, a difference between first pixel values associated with pixels of said first image and second pixel values associated with corresponding pixels of the baseline image, thereby obtaining a plurality of difference values; and after calculating said difference, calculating, by the processor, a first preset value of two preset values for difference values of the plurality of difference values that exceed the first predetermined threshold.

Aptly, whereby determining that the foreign object is not present in the first or further image comprises:

determining that the foreign object is not present in the first or further image when less than a predefined amount of the first preset value exceeds a second predetermined threshold in at least one region of interest associated with the internal region.

Aptly, the method further comprising:

determining that the foreign object is not present in the first or further image when a predefined percentage of the first preset value does not exceed the second predetermined threshold in the at least one region of interest.

Aptly, the method further comprising:

calculating said first preset value by applying, by the processor, a thresholding algorithm to the plurality of difference values.

Aptly, the method further comprising:

calculating said difference to obtain the plurality of difference values by subtracting, by the processor, all pixel values associated with the pixels of the first image from all corresponding pixel values associated with the pixels of the baseline image, or vice versa.

Aptly, the method further comprising:

generating, by the processor, a difference image comprising pixels each having a pixel value equal to one of the plurality of difference values.

Aptly, the method further comprising:

generating, by the processor, a threshold image comprising pixels having values equal to the first preset value and pixels having values equal to a second preset value of the two preset values, the second preset value representing difference values of the plurality of difference values that do not exceed the first predetermined threshold.

Aptly, the method further comprising:

capturing, by the imaging device, said first image and each further image after a transaction has been conducted on the transaction terminal.

Aptly, the method further comprising:

capturing, by the imaging device, an original baseline image with the imaging device during startup of the active peripheral device on the transaction terminal; and when the foreign object is not determined as being present in the first image, replacing the original baseline image with said first image, thereby providing an updated baseline image.

Aptly, the method further comprising:

for each further image, when the foreign object is not determined as being present in the further image, replacing the updated baseline image with the further image.

Aptly, the method further comprising:

responsive to determining that the imaging device is in the dummy peripheral device, issuing, by the processor, an alert.

Aptly, whereby the active peripheral device is a card reader and the foreign object is a card skimming device.

According to a second aspect of the present invention there is provided a transaction terminal, comprising:

an imaging device configured to capture images of an internal region of a peripheral device; and at least one processor comprised within or communicatively coupled to peripheral device, the processor configured to:

calculate a first amount of change between a first image of an internal region of an apparent peripheral device captured by the imaging device and a baseline image of the internal region;

for each further image captured of the internal region by the imaging device, calculate a second amount of change between the further image and a respective baseline image of the internal region; and determine that the imaging device is in a dummy peripheral device to prevent detection of a foreign object in an active peripheral device of the transaction terminal when at least two consecutive values of the first and/or second amount of change are below a predefined value.

According to a third aspect of the present invention there is provided a computer program comprising instructions which, when executed by a computing device, cause the computing device to carry out the steps of the method defined by the first aspect of the present invention.

According to a fourth aspect of the present invention there is provided a computer-implemented method for determining whether a foreign object is present in a peripheral device of a transaction terminal, comprising the steps of:

capturing, by an imaging device of a peripheral device of a transaction terminal, a first image of an internal region of the peripheral device;

calculating, by a processor of the transaction terminal, a difference between first pixel values associated with pixels of said first image and second pixel values associated with corresponding pixels of a baseline image of the internal region, thereby obtaining a plurality of difference values; and when more than a predetermined number of the plurality of difference values exceed a first predetermined threshold in at least one region of interest associated with the internal region, determining, by the processor, that a foreign object is present in the peripheral device, or when less than the predetermined number of the plurality of difference values exceed the first predetermined threshold in the at least one region of interest associated with the internal region, determining, by the processor, that a foreign object is not present in the peripheral device.

Aptly, the method further comprising:

after calculating said difference, calculating, by the processor, a first preset value of two preset values for difference values of the plurality of difference values that exceed the first predetermined threshold; and determining that the foreign object is present in the peripheral device when more than a predefined amount of the first preset value exceeds a second predetermined threshold in the at least one region of interest.

Aptly, the method further comprising:

determining that the foreign object is present in the peripheral device when a predefined percentage of the first preset value exceeds the second predetermined threshold in the at least one region of interest.

Aptly, the method further comprising:

calculating said first preset value by applying, by the processor, a thresholding algorithm to the plurality of difference values.

Aptly, the method further comprising:

calculating said difference to obtain the plurality of difference values by subtracting, by the processor, all pixel values associated with the pixels of the first image from all corresponding pixel values associated with the pixels of the baseline image, or vice versa.

Aptly, the method further comprising:

generating, by the processor, a difference image comprising pixels each having a pixel value equal to one of the plurality of difference values.

Aptly, the method further comprising:

generating, by the processor, a threshold image comprising pixels having values equal to the first preset value and pixels having values equal to a second preset value of the two preset values, the second preset value representing difference values of the plurality of difference values that do not exceed the first predetermined threshold.

Aptly, the method further comprising:

capturing, by the imaging device, said first image after a transaction has been conducted on the transaction terminal.

Aptly, the method further comprising:

capturing, by the imaging device, an original baseline image with the imaging device during startup of the peripheral device on the transaction terminal; and when the foreign object is not determined as being present in the peripheral device, replacing the original baseline image with said first image or a further image captured by the imaging device, thereby providing an updated baseline image.

Aptly, the method further comprising:

capturing, by the imaging device, said first image and the baseline image at a common brightness level.

Aptly, whereby capturing said first image and the baseline image at the common brightness level comprises:

for each of the first image and the baseline image:

recording a video comprising a plurality of image frames;

selecting an image frame of the plurality of image frames having a first brightness level that is within a preset range of brightness levels; and adjusting the first brightness level of the selected image frame to correspond to the common brightness level.

Aptly, the method further comprising:

responsive to determining that the foreign object is present, issuing, by the processor, an alert.

Aptly, the method further comprising:

responsive to issuing the alert, temporarily placing the transaction terminal into an inactive state.

Aptly, the method further comprising:

after placing the transaction terminal into the inactive state, capturing, by the imaging device, at least one further image of the internal region over a preset time period; and when the foreign object is determined as being present in each of said at least one further image, placing the transaction terminal into an out of service state.

Aptly, the method further comprising:

calculating, by the processor, a first amount of change between the first image and the baseline image;

capturing, by the imaging device, at least one further image of the internal region;

for each further image, calculating, by the processor, a second amount of change between the further image and a respective baseline image of the internal region; and when at least two consecutive values of the first and/or second amount of change are below a predefined value, determining, by the processor, that the imaging device is in a dummy peripheral device to prevent detection of a foreign object in an active peripheral device of the transaction terminal.

Aptly, the method further comprising:

when capturing the first image, illuminating the internal region of the peripheral device with at least one light source, optionally whereby the light source is integrated within the imaging device.

Aptly, whereby each region of interest is a predefined region of the internal region where components of the peripheral device remain static in all images captured by the imaging device.

Aptly, whereby the peripheral device is a card reader and the foreign object is a card skimming device.

According to a fifth aspect of the present invention there is provided a transaction terminal, comprising:

at least one peripheral device comprising an imaging device configured to capture images of an internal region of the peripheral device; and at least one processor comprised within or communicatively coupled to the peripheral device, the processor configured to:

calculate a difference between first pixel values associated with pixels of a first image of the internal region and second pixel values associated with corresponding pixels of a baseline image of the internal region, to obtain a plurality of difference values; and determine that a foreign object is present in the peripheral device when a predetermined number of the plurality of difference values exceed a first predetermined threshold in at least one region of interest associated with the internal region, or determine that a foreign object is not present in the peripheral device when less than the predetermined number of the plurality of difference values exceed the first predetermined threshold in the at least one region of interest associated with the internal region.

According to a sixth aspect of the present invention there is provided a computer program comprising instructions which, when executed by a computing device, cause the computing device to carry out the steps of the method defined by the fourth aspect of the present invention.

Certain embodiments of the present invention help avoid a potential vulnerability when detecting foreign objects inside peripheral device using image analysis.

Certain embodiments of the present invention help detect when a peripheral device has been modified by a nefarious party.

Certain embodiments of the present invention help prevent a peripheral device of a transaction terminal from continuing to operate thinking that no foreign object is present within it when in fact there is a foreign object within it.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
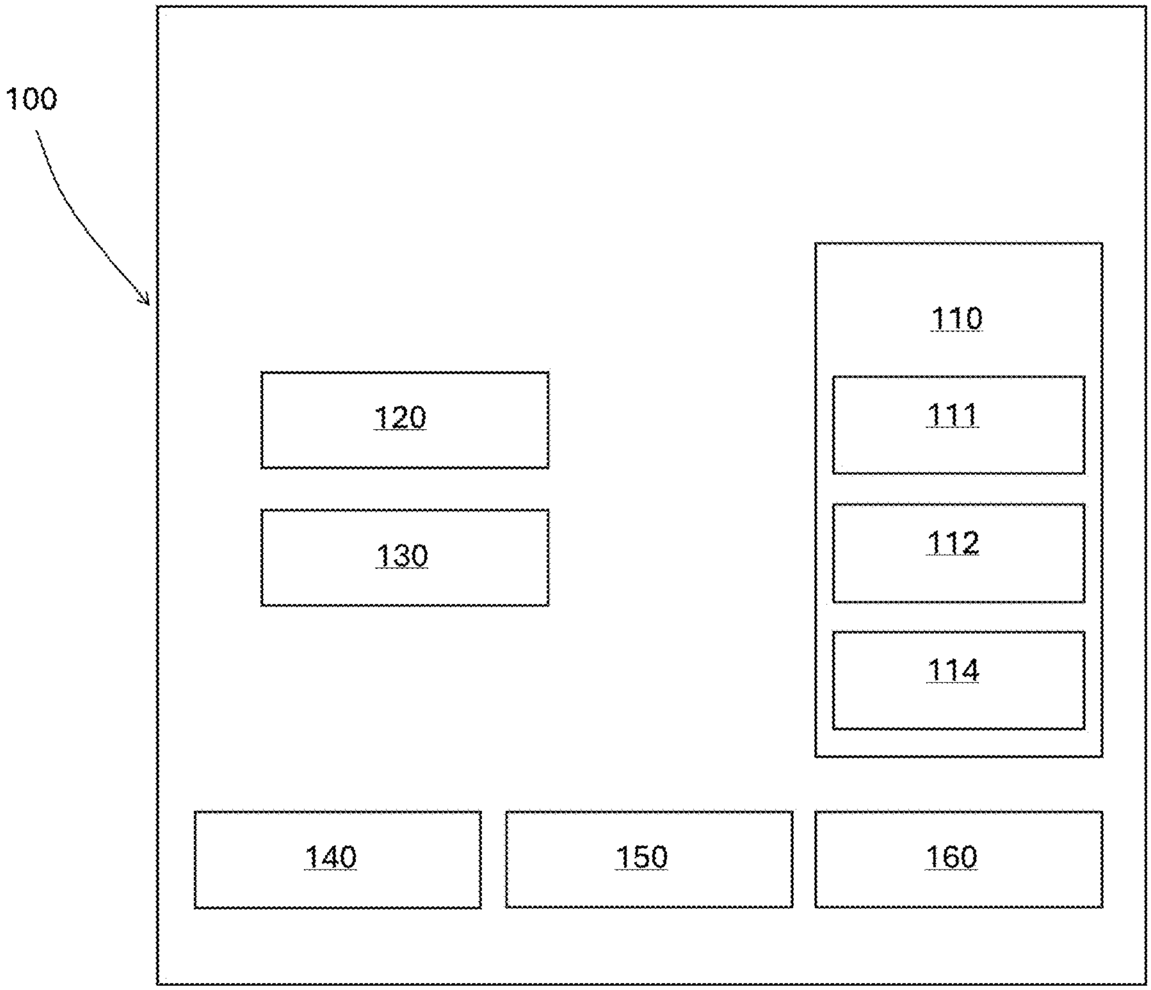
FIG. 1 illustrates a transaction terminal.

FIG. 1 illustrates a transaction terminal 100. It will be appreciated that according to certain embodiments of the present invention, the transaction terminal may be an Automated Teller Machine (ATM), an Interactive Teller Machine (ITM), a Point of Sale (POS) terminal, a Self Service Terminal (SST), a kiosk or the like. The transaction terminal 100 may include at least one card reader 110, one or more processors 120, at least one memory 130 (which may be a non-transitory computer-readable storage medium), at least one cash dispenser 140, at least one cash recycler 150, at least one media depository 160 (e.g., a cash storage bin). The card reader 110, cash dispenser 140, cash recycler 150 and media depository 160 are examples of peripheral devices of the transaction terminal. Any of these peripheral devices may perform the methodology as described herein to detect unexpected foreign objects that are present in the peripheral device (and that are not meant to be there) by using imaging devices. For example, the card reader 110 may include at least one imaging device 111 for capturing one or more images of an internal region of the card reader, one or more processors 112 and at least one memory 114. The memory 114 may be a non-transitory computer-readable storage medium. The processors 112 and memory 114 may be integrated within the imaging device 111. The memory 114 may store executable software that is executable by the processor(s) 120 of the transaction terminal and/or the processor(s) 112 of the card reader to perform the methodology described herein. Likewise, the memory 130 may store executable software that is executable by the processor(s) 120 of the transaction terminal and/or the processor(s) 112 of the card reader to perform the methodology described herein. For example, upon capture of an image by the imaging device 111, the image data could be passed to processor(s) 112 or processor(s) 120 where the executable instructions stored in the memory 114 or 130 can be executed to perform the methodology described herein on the image data.

The transaction terminal 100 may also include a display (not shown) which displays a graphical user interface for enabling the user to enter details and select options during transactions at the terminal. The transaction terminal functionality is configurable to suit the context and environments in which it is situated by including any combination of conventional transaction terminal components and/or peripheral devices. The transaction terminal may for example also include any combination of an encrypted PIN pad (not shown), a receipt printer (not shown), a barcode reader (not shown), a card printer (not shown), a touchscreen (not shown), a coin dispenser (not shown), a rolled coin dispenser (not shown), a microphone (not shown), speakers (not shown), mixed media deposit (not shown), biometric user authentication (not shown), cheque deposit module (not shown) or the like as will be appreciated by a person of skill in the art. It will be appreciated that according to certain other embodiments of the present invention, an imaging device could be included within other peripheral devices of the transaction terminal 100 and the methodology described herein could thus be applied to other peripheral devices of the transaction terminal 100 to detect foreign objects in those peripheral devices.

Figure 2:
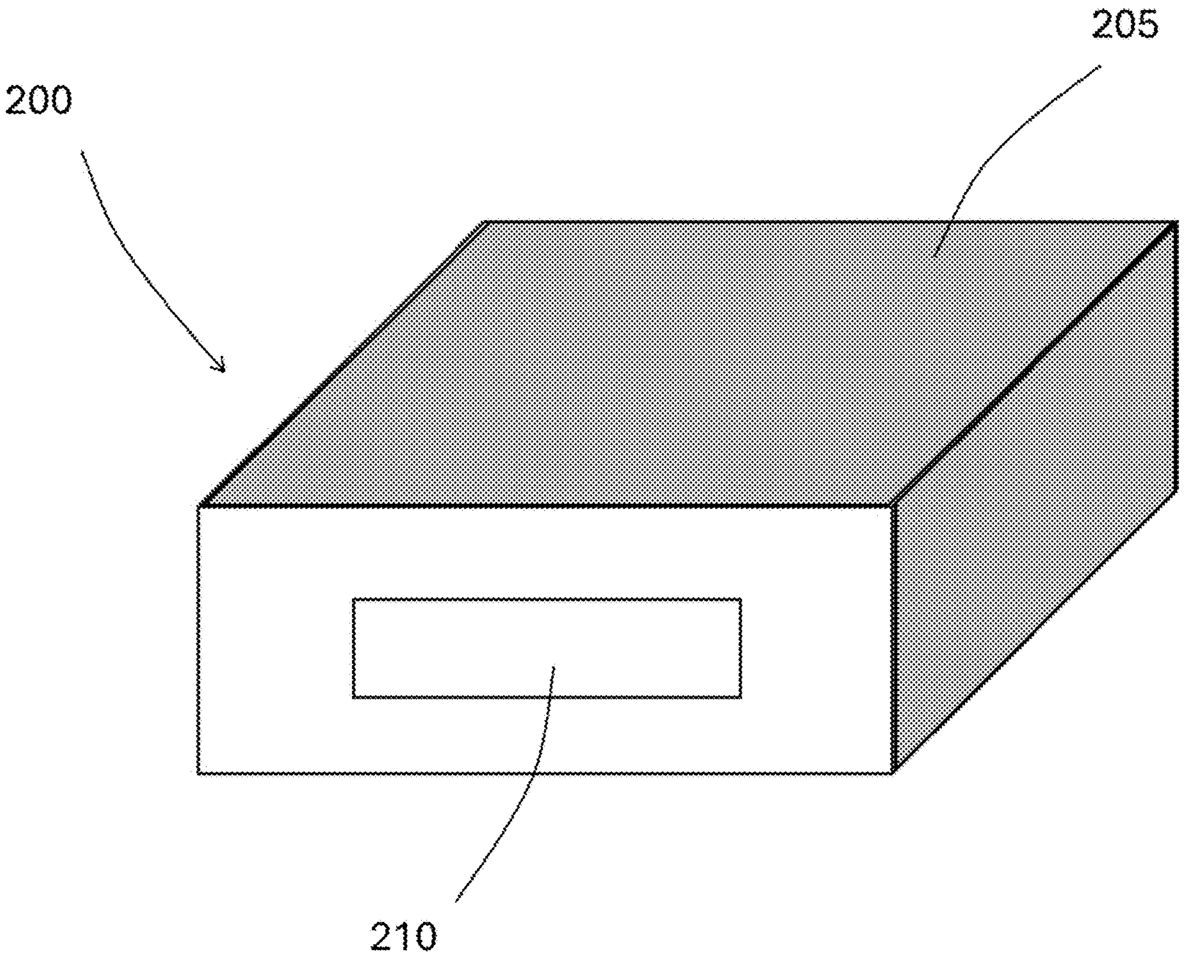
FIG. 2 illustrates a card reader.

FIG. 2 illustrates a perspective view of a card reader 200. The card reader 200 may be the card reader 110 of FIG. 1. The card reader 200 may include a housing 205 and shutter 210. The housing 205 covers the internal components of the card reader 200. The housing 205 may be made of an opaque material that blocks light from outside the card reader reaching the internal components of the card reader 200. This helps the imaging device within the card reader to capture images at a substantially equal brightness level. During a transaction at a transaction terminal (e.g., the transaction terminal 100 of FIG. 1), a card may be presented at the outside of the shutter 210. The shutter 210 may be opened through control of processor(s) of the transaction terminal and/or card reader when the transaction terminal is processing a transaction. When no transaction is being processed at the transaction terminal, the processor(s) may maintain the shutter 210 in a closed position. The transaction terminal may cause the shutter 210 to open only during a portion of the transaction where cards are expected to be received or returned. A card may enter and exit the card reader 200 through the shutter 210 during a portion of the transaction where the shutter 210 is open. It is through the shutter 210 that a deep insert skimmer may be inserted by a nefarious party to be retained within the card reader.

Figure 3:
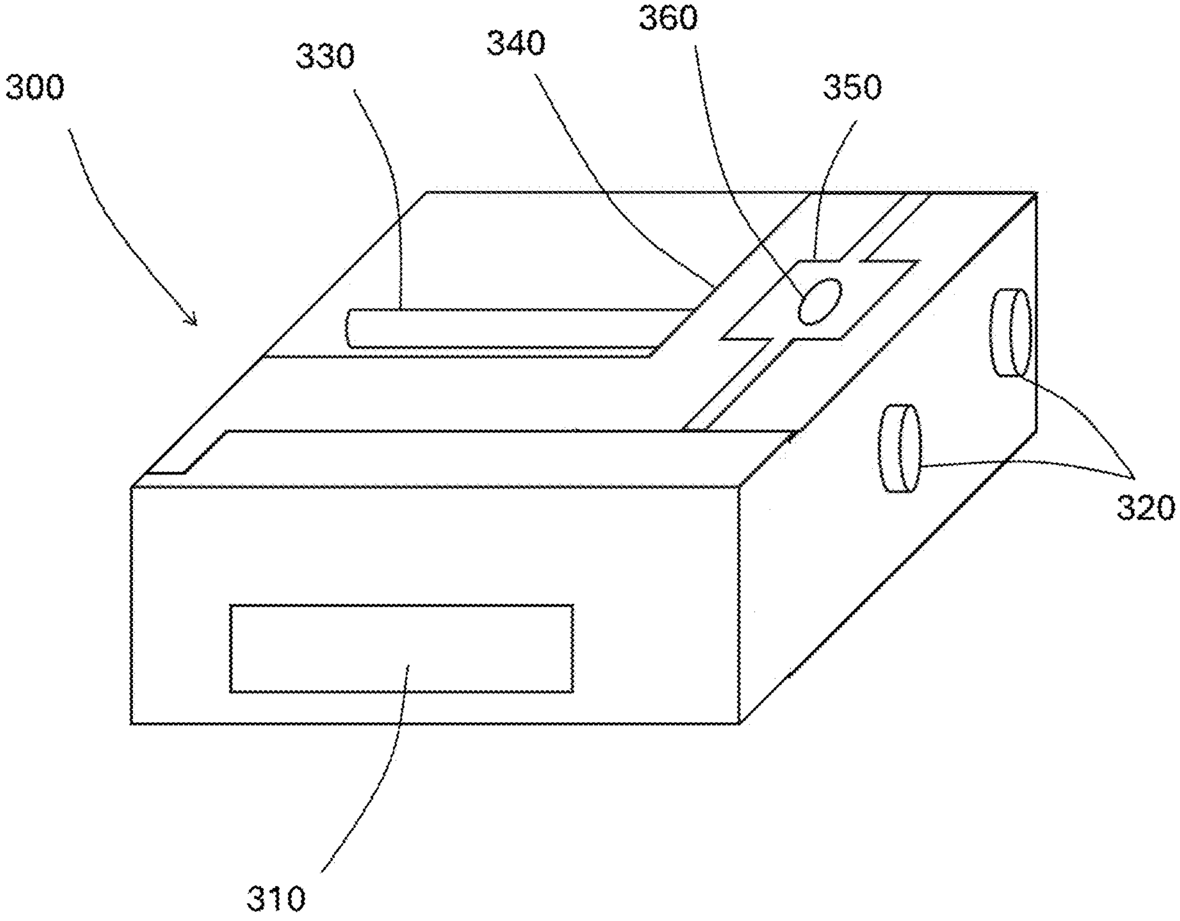
FIG. 3 illustrates a perspective view of a card reader with a card reader housing removed.

FIG. 3 illustrates a perspective view of a card reader 300 with an outer housing removed. For example, the card reader 300 may be the card reader 200 of FIG. 2 with the housing 205 removed to view the inner components. The card reader 300 may include a shutter 310 (like in FIG. 2). The absence of an outer housing in FIG. 3 is to illustrate the internal components of card reader 300 and it will be appreciated that a housing may be present during operation of the card reader (when installed in a transaction terminal). The card reader 300 may include internal components used to transport a card through the card reader during a transaction, such as one or more cogs 320 and one or more rollers 330. It will be appreciated that the cog(s) 320 and roller(s) 330 may be connected to a drive mechanism, such as a motor (not shown) and a drive belt (not shown), in order to rotate the cog(s) 320 and roller(s) 330 in such a way as to enable the entry/exit of a card into the card reader 300 and transport a card through the card reader. It will be appreciated that other internal components may be present within the card reader 110, such as a card sensor (not shown), chip read head (not shown), magnetic read head (not shown) or the like.

As can be seen in FIG. 3, the card reader 300 may include a bracket 340 for housing a board 350 containing an imaging device 360. The bracket 340 may be mounted within the card reader 300. The bracket 340 may be configured in such a way to allow retrofitting to an existing card reader. The board 350 may be a printed circuit board (PCB) containing electronics to power and/or communicate with the imaging device 360 and inputs/outputs to communicate with other electronics in the card reader and/or the transaction terminal. The imaging device 360 may be orientated in such a way that it faces towards the internal components of an internal region of the card reader 300. For example, the lens of the imaging device 360 may be oriented downwards (in the view of FIG. 3) such that the imaging device is configured to capture an image of an internal region of the card reader. The imaging device 360 may thus face a card transport pathway of the card reader. It will be appreciated that the board 350 may be connected to the processor(s) 120 of the transaction terminal 100 via, for example, a USB cable (not shown). The imaging device 360 may be a USB camera. The imaging device 360 may be a wide-angle camera. The imaging device 360 may have one or more integrated light sources. Alternatively, one or more separate light sources (not shown) may be provided. The light source may be a Light Emitting Diode (LED). White light may be used or other single or combinations of wavelengths may be used. The internal region of the card reader may be illuminated using the light source during capture of each image captured by the imaging device.

Figure 4:
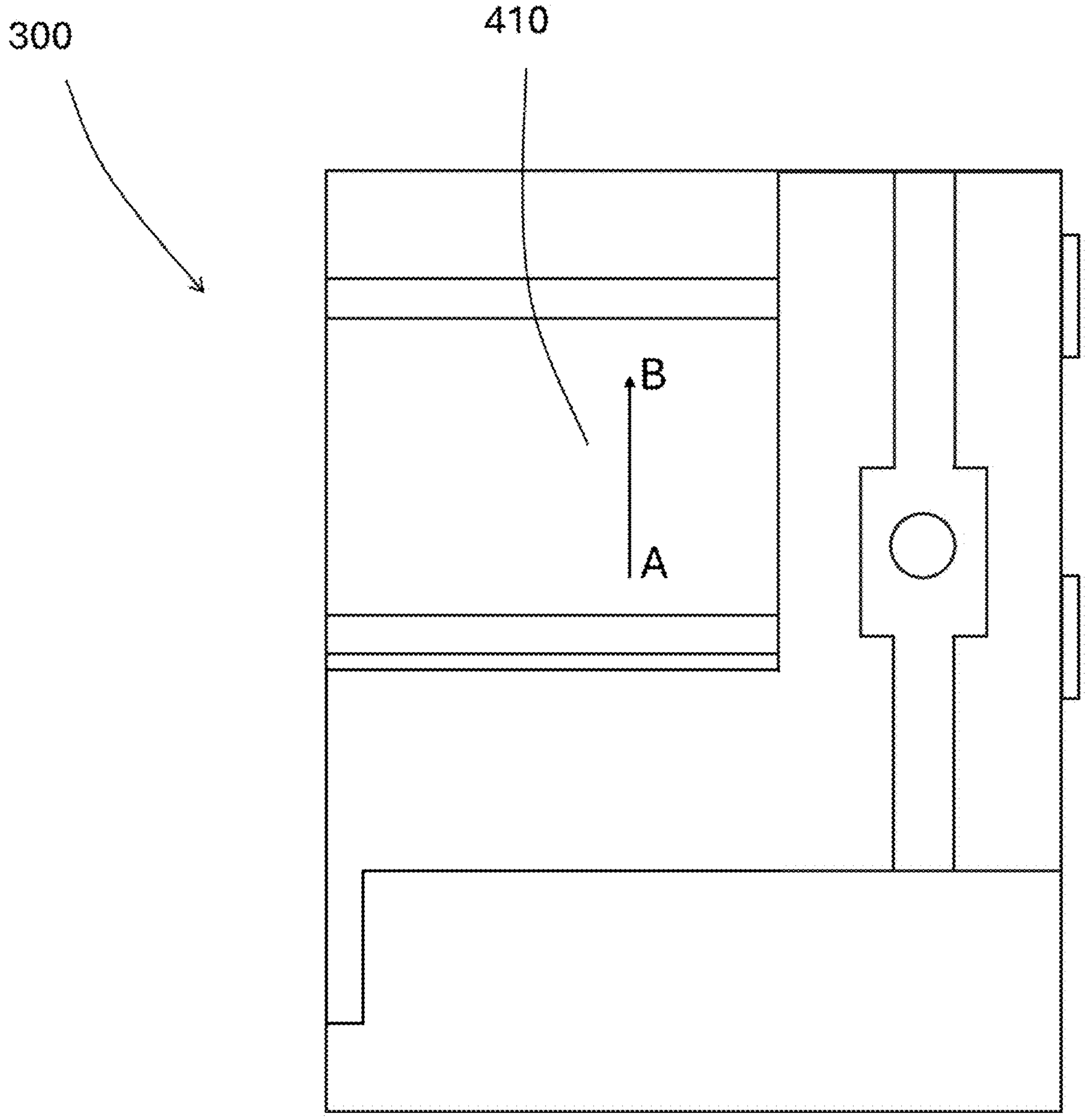
FIG. 4 illustrates a top view of the card reader shown in FIG. 3.

FIG. 4 illustrates a top view of the card reader 300 to help illustrate a card transport pathway which can be captured by the imaging device. As can be seen in FIG. 4, transport of a card (e.g., a debit/credit card) through the card reader 300 may occur along card transport path 410, in the direction of the arrow from A to B (during card entry). It will be appreciated that the card will travel in the opposite direction during egress of the card from the card reader. Following insertion of a foreign object such as a skimmer (e.g., a deep skimming insert) into the card reader by a nefarious party, the foreign object will not leave the card reader and will lay within the card transport pathway such that it can attempt to read information from subsequent cards inserted into the card reader.

Figure 5:
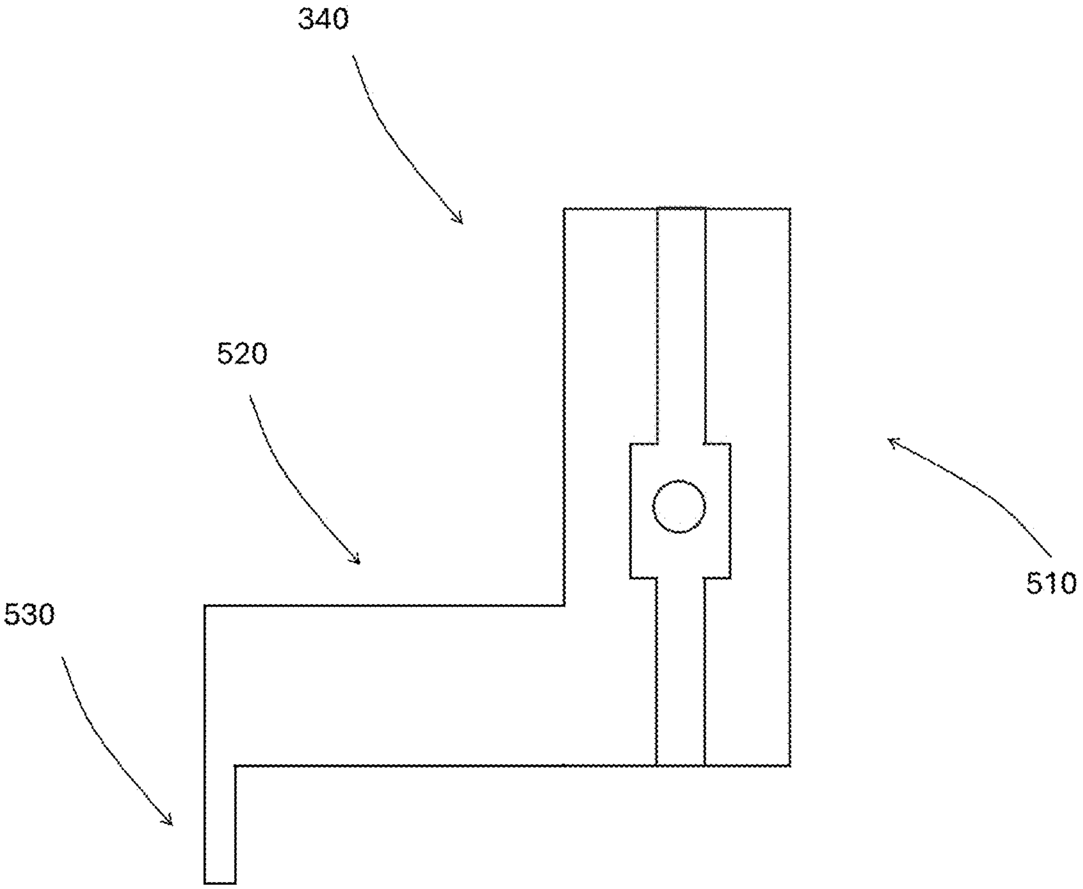
FIG. 5 illustrates a bracket supporting a board that includes an imaging device.

FIG. 5 illustrates the bracket 340 of the card reader 300 illustrated in FIG. 3. The bracket 340 may have a shape such that it can be mounted within a card reader and may be configured to allow for retrofitting to an existing card reader. The bracket 340 may have a first region 510, a second region 520, and a third region 530. The first region 510 supports the PCB board 350. As can be seen, the board 350 extends along a full length of the first region 510. The imaging device 360 is located approximately halfway along a length of the first region. When installed in the card reader, the first region 510 extends along a length of the card reader from a side of the card reader opposite the side including the shutter. The first region 510 extends over halfway along the length of the card reader (the length being between the side with the shutter and the side opposite the side with the shutter). The first region 510 has two long edges and two short edges. One of the short edges abuts the side of the card reader opposite the shutter. When installed, a long edge of the first region 510 abuts part of a side of the card reader extending between the shutter side and the side opposite the shutter side. When installed, the second region 520 extends away from the first region in a direction substantially perpendicular to the first region 510. That is, the second region 520 has two long edges and two short edges and the two long edges of the second region 520 are perpendicular to the two long edges of the first region 510. The second region 520 extends from the first region 510 to the side of the card reader that is opposite the side abutted by the long edge of the first region 510. Thus one short edge of the second region abuts a long edge of the first region and one short edge abuts a side of the card reader. The third region 530 extends away from the second region 520 in a direction perpendicular to the second region 520 and parallel to the first region 510. That is, the third region has two short edges and two long edges and the long edges are substantially perpendicular to the long edges of the second region 520 and also substantially parallel to the long edges of the first region 510. A long edge of the first region abuts part of the side wall opposite the side abutted by the long edge of the first region 510. The first region 510 and the third region 530 thus help to hold the bracket in the card reader in a specific location. It will be appreciated that the bracket 340 may be manufactured as a single component or may be manufactured from an assembly of multiple components. It will be appreciated that in certain embodiments of the present invention, the bracket may take a different size or shape whilst still being able to support the imaging device and also be held within a card reader (or other peripheral device).

Figure 6:
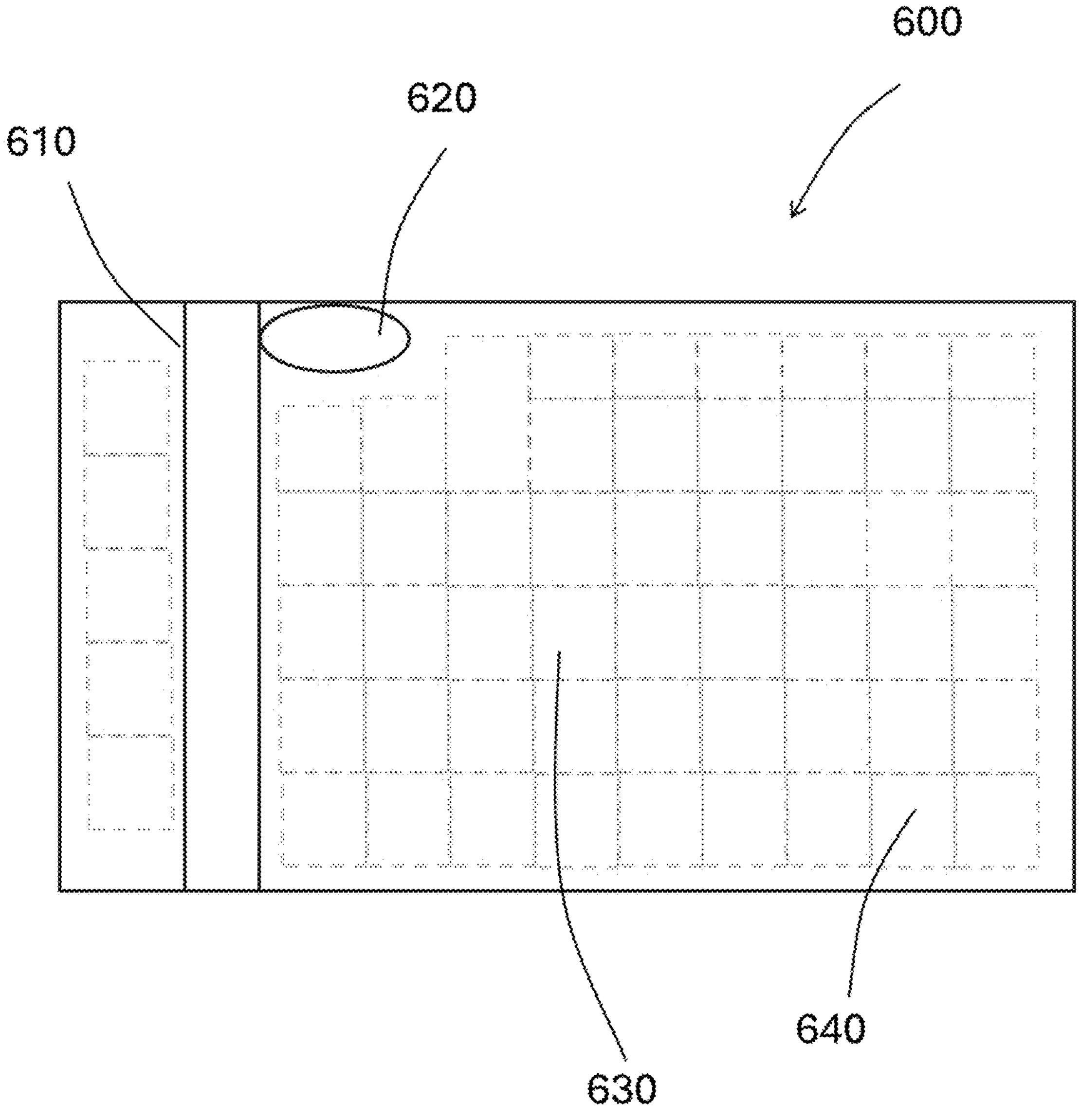
FIG. 6 illustrates an internal region of a card reader.

FIG. 6 illustrates a view of part of an internal region 600 of a card reader. The view of the internal region shown in FIG. 6 might be the view as it is captured by an imaging device of the card reader. For example, this may be an image captured by the imaging device 360. The view of the internal region 600 as it is captured by the imaging device may include a view of internal components from the internal region of the card reader, such as a roller 610 or cog 620, that move during a transaction (e.g., in order to transport a card through the card reader). The view of the internal region 600 as it is captured by the imaging device may also include a view of the card transport path 630 which does not move during a transaction. As can be seen in FIG. 6, one or more regions of interest 640 can be defined in the internal region. The region(s) of interest are associated with the internal region in the sense that it is these regions of the internal region that are analysed to detect whether a foreign object is present in images taken of the internal region. Once defined with respect to the internal region, these region(s) of interest can be applied to different types of images representing the internal region so that the images can be analysed in these regions. In FIG. 6, there are five regions of interest defined to the left of the roller 610 and 51 regions of interest defined to the right of the roller 610. These regions of interest have a substantially square or rectangular shape and are substantially equal in size. It will however be appreciated that the regions of interest 640 may be different shapes, such as rectangles or circles, and different sizes. It will also be appreciated that any number of regions of interest may be present to the left/right of the roller 610 or no regions of interest might be present to one side of the roller. It will also be appreciated that the regions of interest 640 may be arranged in a grid pattern, or there may be a single large region of interest (e.g., to the right of roller 610), or there may be multiple separated regions of interest. As an example, there may only be 4 regions of interest to the right of the roller 610, each of those regions having a size approximately equal to a combined size of 9 regions of interest as they are shown in FIG. 6. The regions of interest 640 may be arranged to avoid internal components that move during a transaction, such as roller 610 or cog 620. Essentially, each region of interest is a predefined region of the internal region where components of the peripheral device (i.e., card reader) remain static in all images captured by the imaging device. The regions of interest are chosen as regions where there should be minimal change in the internal region between transactions. Once regions of interest associated with the internal region of the card reader are chosen using a reference image of the internal region taken by an imaging device, co-ordinates for the regions of interest 640 may be stored in a memory, such that they can be applied in the same way to each image captured of the internal region of the card reader. In this way, the regions of interest are effectively dimensions or pixel co-ordinates of each image declared based on a view of the internal region of the card reader.

Figure 7:
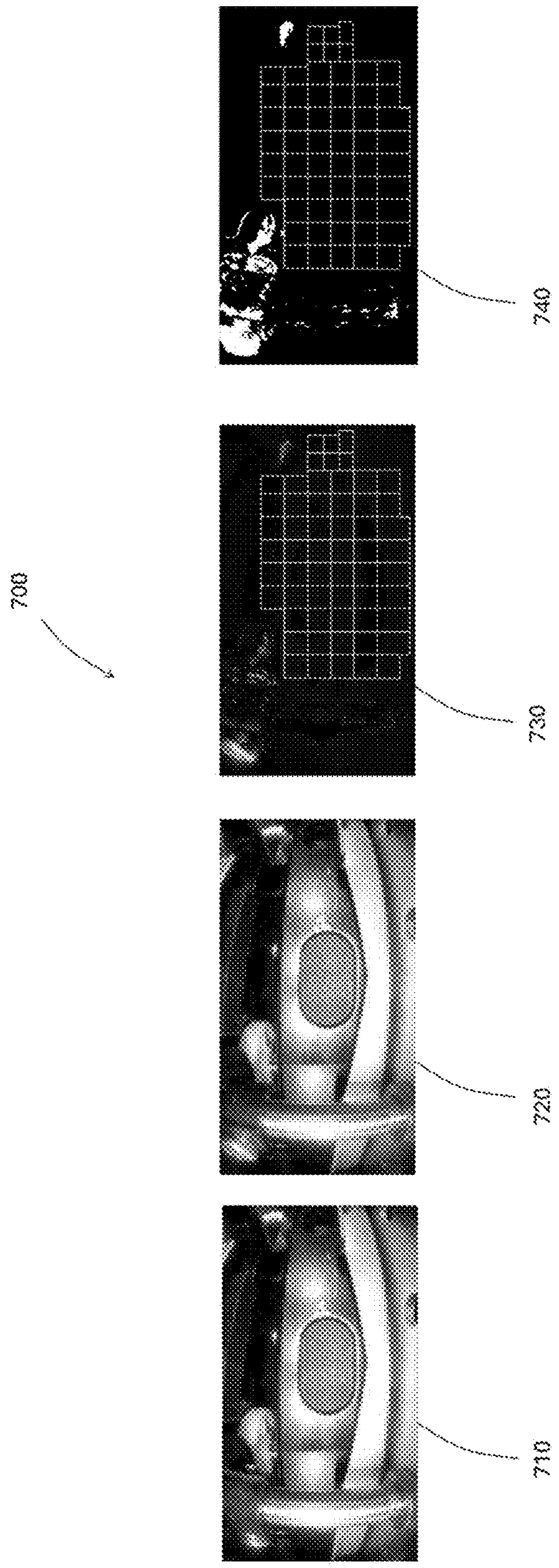
FIG. 7 illustrates images captured/generated during an analysis procedure when no foreign object is present in a card reader.

FIG. 7 illustrates images that may be used/generated during an analysis procedure 700 to determine whether a foreign object is present in a card reader (in this example no foreign object is present). The images may include a baseline image 710, a comparison image 720, a difference image 730 and a threshold image 740.

The baseline image 710 may be an original baseline image captured by an imaging device of the card reader during the first startup of the day of a card reader on a transaction terminal (i.e., when the transaction terminal is turned on). The baseline image 710 however may be updated during the course of a day, such that if the analysis procedure indicates that there is no foreign object present in the card reader following a transaction then the baseline image 710 may be updated by replacing the previous baseline image with a new captured image. In this way insignificant slow trend differences can be smoothed out. Broadly speaking, a baseline image is an image of the internal region captured when it is known or it has been determined that no foreign object is present inside the card reader. It will be appreciated that the analysis procedure can be carried out by storing pixel values for the baseline image as an array of data without necessarily storing a baseline image in an image format.

The comparison image 720 may be captured by the imaging device following removal of a card from the card reader after a transaction has been conducted on the transaction terminal 100. A comparison image may also be captured if sensors on the transaction terminal indicate a card was initially present at the transaction terminal media entry (i.e., the shutter), but then removed with no transaction taking place. The comparison image is captured for comparison with the baseline image in order to determine whether a foreign object is present in the card reader (e.g., if one has been inserted during the previous transaction). It will be appreciated that the analysis procedure can be carried out by utilising pixel values for the comparison image as an array of data without necessarily using a comparison image in an image format.

Both the baseline image 710 and comparison image 720 may be captured at a common brightness level. The baseline image 710 and comparison image 720 may be captured by the imaging device of the card reader by recording a video for a preset amount of time, for example 8 seconds. The brightness of each individual frame during a video may be calculated to find a frame with a brightness level within a preset range of brightness levels, for example a range of 110 to 130 brightness. The first frame found during the video with a brightness within the preset range of brightness levels may be the image frame selected to use. The baseline image 710 and comparison image 710 used in the analysis procedure may be the selected image frame with the brightness level of the selected image frame adjusted to the common brightness level, for example a brightness level of 120. This helps ensure a comparison takes place using images of the same brightness level.

If there is no frame within the preset range of brightness levels in a video, the imaging device may try to take another video. If there is no frame within the preset range of brightness levels in the second video, an alert may be raised indicating the images are too dark or bright.

The difference image 730 may be calculated by the processor after capture of the comparison image 720. For example, this may be achieved by utilising an image subtraction algorithm wherein the pixel values of the comparison image are subtracted from the corresponding pixel values of the baseline image or vice versa. A difference value may be calculated for each pixel by taking the absolute value of the difference between the pixel value of a certain pixel in the comparison image 720 and the pixel value of the corresponding pixel in the baseline image 710. The difference image 730 may be an image with pixel values equal to the difference value for each corresponding pixel in the baseline image 710 and comparison image 720. It will be appreciated that the analysis procedure can be carried out by calculating difference values for each pixel and storing these difference values as an array of data without necessarily producing a difference image 730. It will also be appreciated that difference values do not necessarily need to be calculated for each and every pixel of the baseline/comparison image and a set of difference values may be calculated for only some of the pixels in order to enable determination of the presence of a foreign object.

In the case of analysis procedure 700, there is no foreign object present in the card reader and there is thus little change in the pixel values between the baseline image 710 and comparison image 720 for a large part of the internal region of the card reader. During a transaction, internal components within the internal region of the card reader, such as a roller or cog, may move in order to transport a card through the card reader. The pixels corresponding to these internal components may therefore show a change in pixel value between the baseline image 710 and comparison image 720 and hence pixels corresponding to the roller and cog appear non-black in difference image 730. Thus, regions of interest are defined away from the moving parts to perform the determination of presence of a foreign object in the card reader. Once the difference values have been calculated, it can be determined whether a predetermined number of these difference values exceed a first predetermined threshold in one or more of the regions of interest. For example, if the first predetermined threshold is 20 then how many of the difference values exceed 20 can be analysed within each region of interest. If in one or more of the regions of interest there is a predetermined number of difference values that exceed this threshold (e.g., 30% of the difference values within any given region of interest), then it may be determined that a foreign object is present. However, in the case of difference image 730, the difference values within all regions of interest are effectively 0 and so a determination that no foreign object is present will be made. It will be appreciated that different image analysis algorithms could be applied to the difference image (or the pixel data associated with the difference image) to make this determination.

One way to help the analysis procedure to determine presence of a foreign object is to generate a threshold image 740. This may be calculated by the processor after calculation of the difference image 730. For example, a thresholding algorithm may be applied to the difference image to determine which of the difference values exceed the first predetermined threshold. The open-source computer vision library OpenCV may for example be utilised to apply image thresholding. Image thresholding removes the variance between images by removing features and highlighting change. For example, for those difference values that exceed the first predetermined threshold (e.g., 20), a first preset value of two preset values may be allocated (this may be a number such as "1" or a colour such as "white"). For those difference values that do not exceed the first predetermined threshold, a second preset value of the two preset values may be allocated (this may be a number such as "0" or a colour such as "black"). The threshold image 740 may be a black and white image where pixels with a pixel value of the first preset value are white (representing a change) and pixels with a pixel value of the second preset value are black (representing no change). As there is no foreign object present in the card reader in FIG. 7, there is little change in the pixel values between the baseline image 710 and comparison image 720 for a large part of the internal region of the card reader. Thus, only the pixels corresponding to the internal components that move during a transaction may show white pixels. It will be appreciated that the analysis procedure can be carried out by assigning one of the two preset values to each pixel (or some pixels) via the thresholding algorithm and storing these preset values as an array of data without necessarily producing a threshold image.

Once the threshold image 740 (or the data associated with the pixels of the threshold image) has been generated, the processor may determine that there is no foreign object present in the card reader by calculating the number of pixels with pixel values equal to the first preset value within each region of interest of threshold image 740. If a number/amount of pixels with a pixel value equal to the first preset value is below a second predetermined threshold within at least one region of interest, this may indicate that there is no foreign object present in the card reader. On the other hand, if a number/amount of pixels with a pixel value equal to the first preset value is above a second predetermined threshold within at least one region of interest, this may indicate that there is a foreign object present in the card reader. It will be appreciated that a percentage of pixels within each region of interest with a pixel value equal to the first preset value could be calculated and compared to the second predetermined threshold or an absolute number of pixels could be calculated and compared. For example, the second predetermined threshold may be 30% of pixels within a region of interest. It will also be appreciated that in order to arrive at a determination that a foreign object is present, it may need to be determined that the amount of the first preset value exceeds the second predetermined threshold in two or more regions of interest, or three or more regions of interest or four or more regions of interest etc. It will be appreciated that in certain other embodiments the determination that there is no foreign object present in the card reader may occur by other means than a thresholding algorithm.

Figure 8:
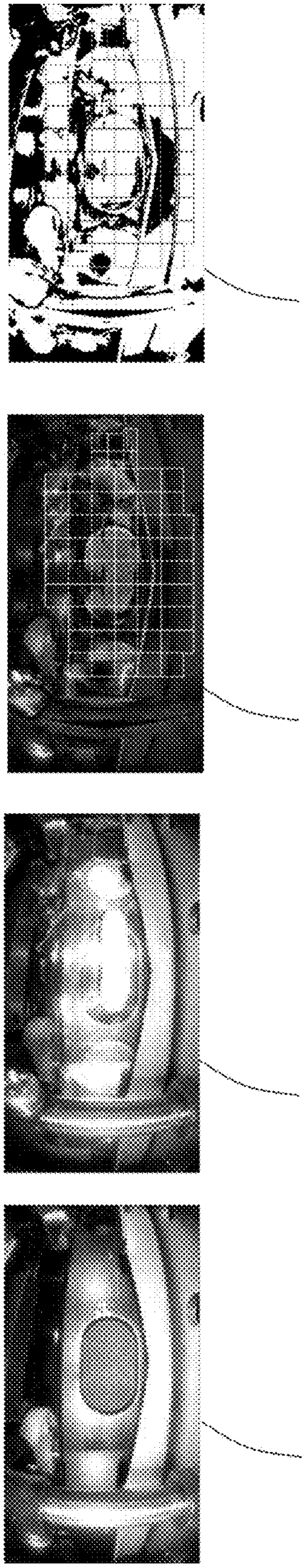
FIG. 8 illustrates images captured/generated during an analysis procedure when a foreign object is present in a card reader.

FIG. 8 illustrates images that may be used/generated during an analysis procedure 800 to determine whether a foreign object is present in a card reader (in this example a foreign object is present). The foreign object may be, for example, a skimming device such as a deep insert skimmer. The images may include a baseline image 810, comparison image 820, difference image 830 and threshold image 840.

The analysis procedure 800 is effectively the same as the analysis procedure 700 described above with respect to FIG. 7. The difference is that now a foreign object is present in the card reader. Thus, the description of the analysis procedure 700 also applies to FIG. 8.

In terms of the baseline image 810, it can be seen that this image is very similar to the baseline image 710. In terms of the comparison image 820, it can be seen that this now looks different to the comparison image 720 due to the presence of a foreign object in the card reader. In terms of the difference image 830, it can be seen that there are now many parts of the image that are non-black indicating there are difference values which are greater than 0 (due to the presence of the foreign object). These difference values can thus be analysed to determine whether they exceed the first predetermined threshold and then a determination can be made as to whether a predetermined number of those values exceed the predetermined threshold in at least one of the regions of interest. If so, a determination is made that a foreign object is present in the card reader. To help the analysis, the threshold image 840 is generated. As can be seen, this appears largely white due to the presence of a foreign object in the card reader and thus differences between the comparison image and the baseline image. As discussed above with reference to FIG. 7, the amount of threshold values in this image with the first preset value can be checked to see whether a second predetermined threshold is exceeded in one or more regions of interest. If so, a determination can be made that a foreign object is present. This causes an alert to be raised on the transaction terminal. After the alert is raised, the transaction terminal is placed into a temporarily inactive state where no transactions can be performed. Then, at least one further image is captured by the imaging device and the analysis procedure is re-performed. If it is still determined that a foreign object is still in the card reader, then the terminal is placed into an out of service state where no transactions can take place until the terminal has been inspected by an engineer.

Figure 9:
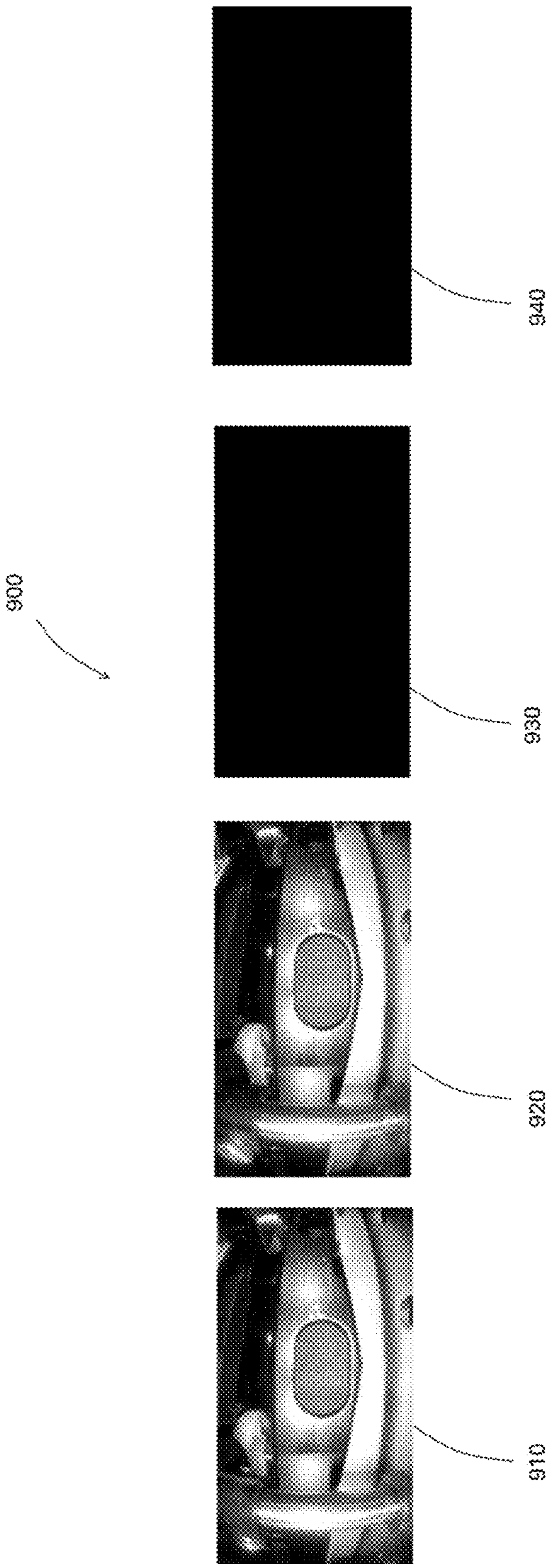
FIG. 9 illustrates images captured/generated during an analysis procedure when an imaging device has been removed from the active card reader and placed into a dummy card reader.

FIG. 9 illustrates images captured during an analysis procedure 900 when the imaging device of the card reader is placed within a dummy card reader (with internal components that do not move) to prevent detection of a foreign object in an active card reader of the transaction terminal. The images may include a baseline image 910, comparison image 920, difference image 930 and threshold image 940.

The analysis procedure 900 is effectively the same as the analysis procedure 700 described above with respect to FIG. 7. The difference is that now the imaging device has been placed in a dummy card reader to try and prevent detection of a foreign object. Thus, the description of the analysis procedure 700 also applies to FIG. 9 in terms of how it is determined whether a foreign object is present in the card reader. FIG. 9 however is illustrating the scenario when the imaging device is placed in a dummy card reader such that the baseline image and comparison image may be identical such that the difference and threshold images show no change at all.

To determine whether the imaging device is in a dummy card reader, in addition to performing the determination as to whether a foreign object is present in the card reader, every time a new comparison image is captured, the total amount of change between the stored baseline image and the comparison image is calculated and stored in memory. For example, a percentage of change may be calculated.

When determining presence of a foreign object in the active card reader, as the card reader will interpret the lack of change as meaning that no foreign object is present, the previously captured image will become the new baseline image after each new comparison image is captured. The percentage of change is calculated between each comparison image and each respective baseline image (i.e., the one that is currently stored after the previous transaction indicated no foreign object as being present). Thus, in this way, a history of percentage change of consecutive baseline image and comparison image comparisons can be stored. It will be appreciated that there should always be a small percentage of change between the baseline image and comparison image due to the card reader roller moving position. That is to say, the roller should change positions between transactions. The percentage of change may be stored for each image comparison and if there is change below a predefined value for a predetermined number of consecutive comparisons then an alert may be raised to indicate that the imaging device has been placed within a dummy card reader. In other words, if there is no change (i.e., percentage change is zero) between at least two (e.g., the previous 5) image comparisons then it is suspected that the camera may have been placed/installed in an alternative card reader that is non-functioning (i.e., a dummy card reader). This is a form of attack to try and trick the terminal into thinking that no foreign object is present. If it is determined that the imaging device has been placed into a dummy card reader, an alert may be raised to say the imaging device has been displaced from the active card reader.

Put another way, the comparison image and baseline image are compared and the full percentage of change between the two images may be stored in an array. Every time the customer's card is removed a check may be performed, to determine if the imaging device has been placed into a dummy card reader. The array may store the percentage of change for the previous 5 customer transactions (the array may store more or less than 5 previous percentages of change). If all values in the array are less than or equal to 1 (i.e., the values do not necessarily have to be zero), then an alert may be raised to inform the terminal that the imaging device has been displaced into a dummy card reader.

It is noted that in the scenario that a card is presented to the shutter but not fully inserted, the percentage of change between images would not be stored and the check to determine if the imaging device is displaced would not be performed. This is because the user only partially inserted their card into the reader and so it cannot be guaranteed that there should be change within the reader (e.g., the card reader rollers may still be in the same position).

Figure 10:
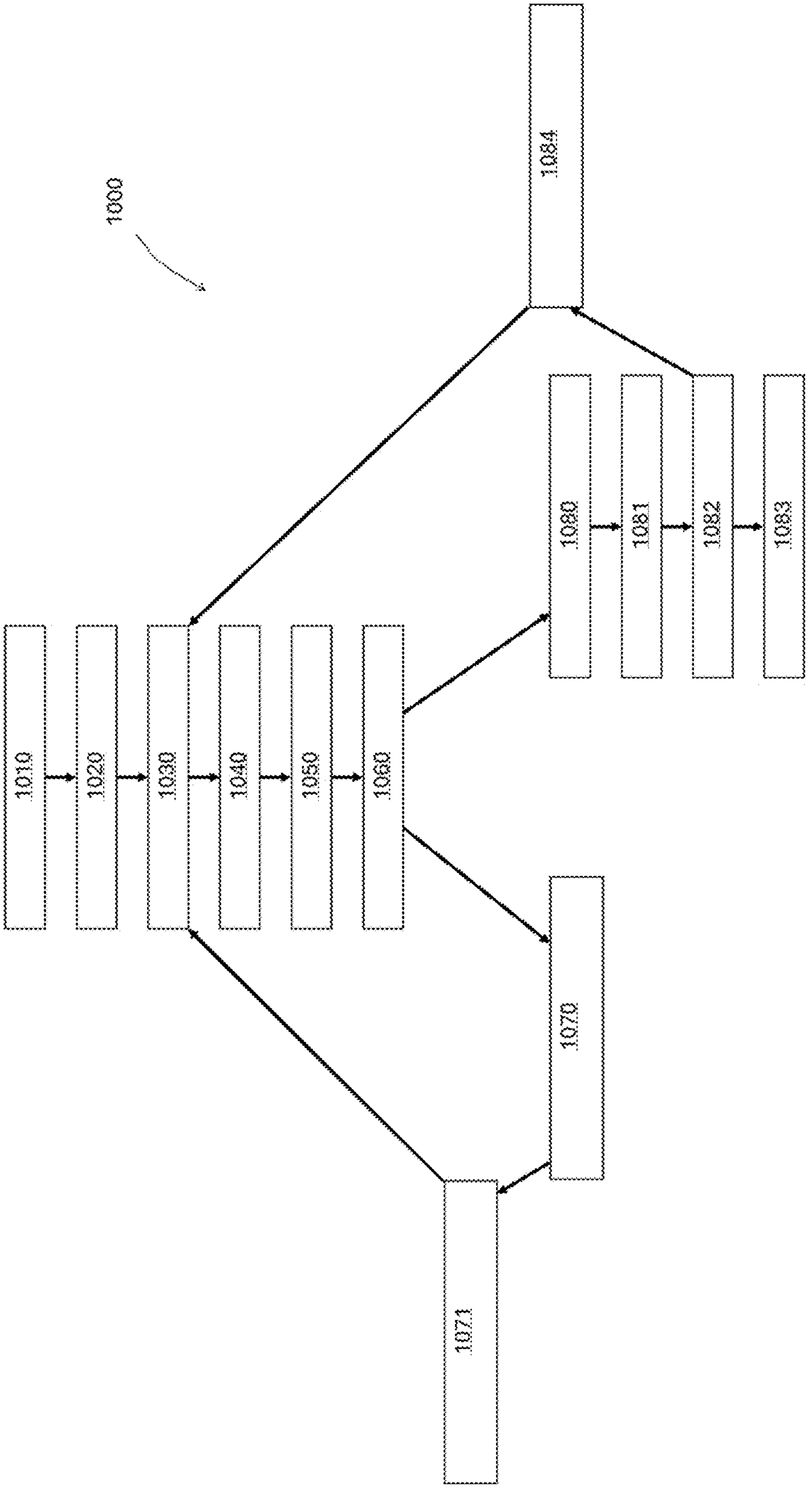
FIG. 10 illustrates a flow diagram for determining whether a foreign object is present in a peripheral device of a transaction terminal.

FIG. 10 illustrates a flowchart 1000 of a method for determining whether a foreign object is present in a peripheral device of a transaction terminal. The method may be executed by a processor of the transaction terminal and/or by a peripheral device of the transaction terminal. In a first step 1010, a transaction terminal with a peripheral device hosting an imaging device is provided. The transaction terminal may be the transaction terminal 100 described above with reference to FIG. 1. The peripheral device may be the card reader 110 described above with reference to FIG. 1.

In a second step 1020, a baseline image of the internal region of the peripheral device is captured by the imaging device at the first startup of the day of the transaction terminal. The baseline image capture may occur by the imaging device recording a video for a preset amount of time, for example 8 seconds. The brightness of each individual frame during the video may be calculated to find a frame with a brightness level within a preset range of brightness levels, for example a range of 110 to 130 brightness. The first frame found during the video with a brightness within the preset range of brightness levels may be the image frame selected to use as the baseline image. The baseline image used may be the selected image frame with the brightness level of the selected image frame adjusted to a common brightness level, for example a brightness level of 120.

In a third step 1030, a comparison image of the internal region of the peripheral device is captured by the imaging device. The comparison image may be referred to herein as a first or further image. The comparison image may be captured after a transaction has been performed on the terminal. For example, if the peripheral device is a card reader, a card may be presented at the entry to the card reader and then removed after a transaction has been processed. This may trigger capture of the comparison image. Presentation of the card without full insertion into the card reader may also trigger capture of a comparison image. Alternatively, a comparison image may be captured without a transaction taking place such as at predefined intervals or random intervals. The comparison image capture may occur by the imaging device recording a video for a preset amount of time, for example 8 seconds. The brightness of each individual frame during the video may be calculated to find a frame with a brightness level within a preset range of brightness levels, for example a range of 110 to 130 brightness. The first frame found during the video with a brightness within the preset range of brightness levels may be the image frame selected to use. The comparison image used may be the selected image frame with the brightness level of the selected image frame adjusted to the common brightness level, for example a brightness level of 120.

In a fourth step 1040, a difference is calculated between pixels in the baseline image and comparison image by taking the absolute value of the difference between the pixel value of a pixel in the baseline image and the pixel value of the corresponding pixel in the comparison image. This results in a series of difference values being obtained. This may be by subtracting one image from the other image. Difference values may be obtained for each pixel of the baseline/comparison image or only a set of those pixels. The array of difference values may be represented as a difference image by generating a difference image from the difference values.

In a fifth step 1050, a threshold algorithm is applied to the difference image (or the pixel data associated with the difference image) to calculate first and second preset values. A first preset value is assigned if the difference value of the corresponding pixel is above a first predetermined threshold and a second preset value is assigned if the difference value of the corresponding pixel is below a first predetermined threshold. The array of preset values may be represented as a threshold image by generating a threshold image from the first and second preset values.

In a sixth step 1060, the percentage of pixels of the threshold image within at least one predefined region of interest with a value equal to the first preset value is compared to a second predetermined threshold. If the percentage of pixels of the threshold image in step 1060 is less than the second predetermined threshold in all regions of interest, then in step 1070 a determination is made that a foreign object is not present in the peripheral device. Subsequent to determining that a foreign object is not present in the peripheral device in step 1070, in step 1071 the previous baseline image is replaced with the comparison image captured in step 1030 to provide an updated baseline image. The process then repeats itself from step 1030 when a further image is captured by the imaging device.

If the percentage of pixels of the threshold image in step 1060 is greater than the second predetermined threshold in one or more regions of interest, then in step 1080 a determination is made that a foreign object is present in the peripheral device. The processor may issue an alert in response to determining that a foreign object is present in the peripheral device and in response to the alert the processor may place the transaction terminal into an inactive state.

Subsequent to determining that a foreign object is present in the peripheral device in step 1080, in step 1081 at least one further image at the common brightness level may be captured by the imaging device over a preset time period. In step 1082, a determination is made if the foreign object is present in each of the at least one further images, by using the same steps as described with reference to steps 1040-1060. If the determination in step 1082 indicates that the foreign object is present in each of the at least one further images, in step 1083 the transaction terminal is placed into an out of service state. If the determination in step 1082 indicates that the foreign object is not present in each of the at least one further images, in step 1084 the transaction terminal is returned to an active state. The process then repeats itself at step 1030 when a further comparison image is captured.

As discussed above, it will be appreciated that steps 1050 and 1060 are optional steps. Instead of utilising a thresholding algorithm, the difference values themselves can be analysed to determine if more than a predetermined number of these values exceed the first predetermined threshold in one or more of the regions of interest. If so, it can be determined that a foreign object is present. If not, it can be determined that a foreign object is not present. As discussed above, thresholding helps assist the determination by highlighting changes in the images.

Figure 11:
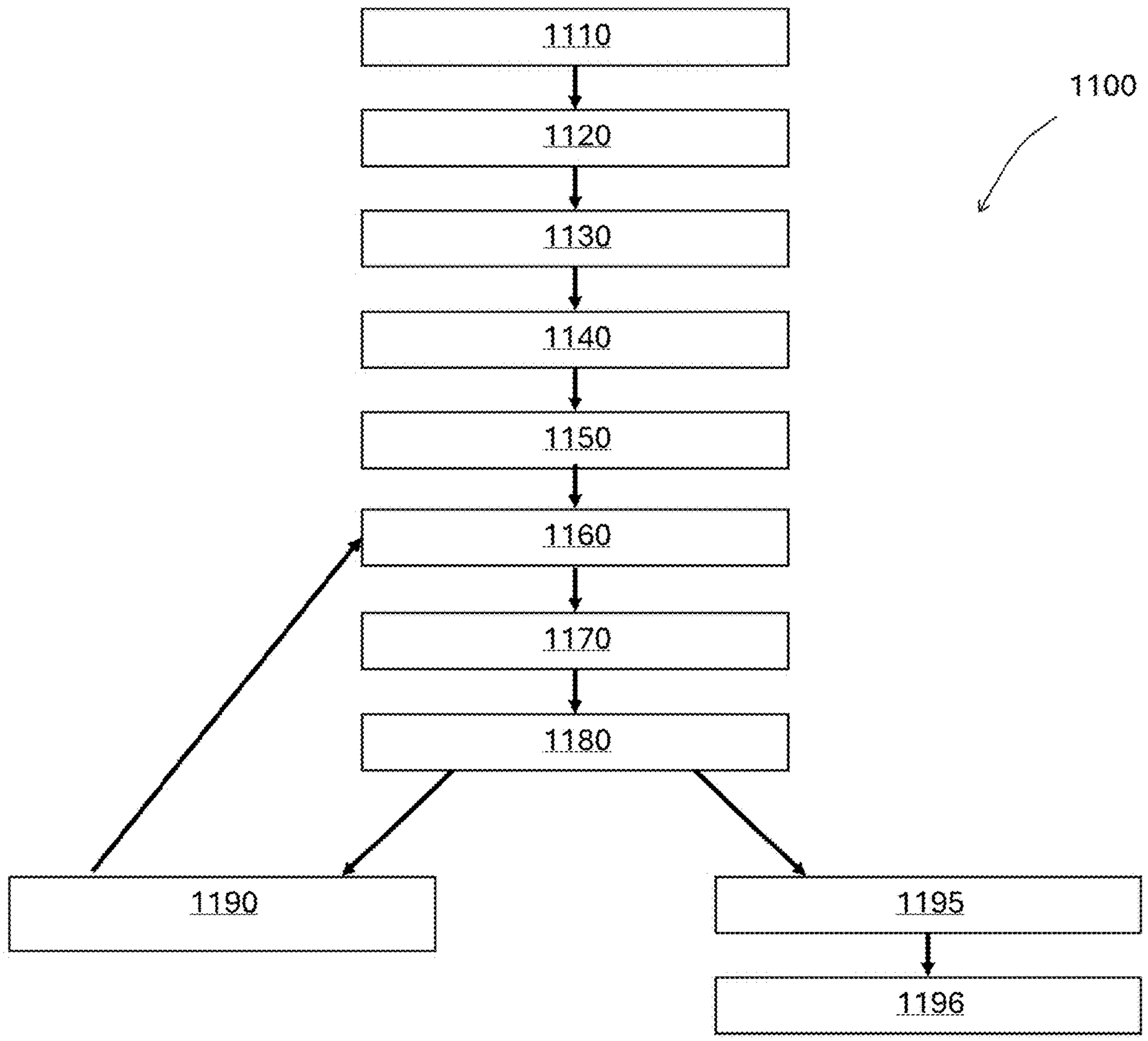
FIG. 11 illustrates a flow diagram for determining that an imaging device for a peripheral device of a transaction terminal is in a dummy peripheral device to prevent detection of a foreign object in an active peripheral device of the transaction terminal.

FIG. 11 illustrates a flowchart 1100 of a method for determining that an imaging device for a peripheral device of a transaction terminal is in a dummy peripheral device to prevent detection of a foreign object in an active peripheral device of the transaction terminal. The method may be executed by a processor of the transaction terminal and/or by a peripheral device of the transaction terminal. In a first step 1110, a transaction terminal with a peripheral device hosting an imaging device is provided. The transaction terminal may be the transaction terminal 100 described above with reference to FIG. 1. The peripheral device may be the card reader 110 described above with reference to FIG. 1.

In a second step 1120, a baseline image of the internal region of the peripheral device is captured by the imaging device at the first startup of the day of the transaction terminal. The baseline image capture may occur by the imaging device recording a video for a preset amount of time, for example 8 seconds. The brightness of each individual frame during the video may be calculated to find a frame with a brightness level within a preset range of brightness levels, for example a range of 110 to 130 brightness. The first frame found during the video with a brightness within the preset range of brightness levels may be the image frame selected to use as the baseline image. The baseline image used may be the selected image frame with the brightness level of the selected image frame adjusted to a common brightness level, for example a brightness level of 120.

In a third step 1130, a comparison image of the internal region of the peripheral device is captured by the imaging device. The comparison image may be referred to herein as a first or further image. The comparison image may be captured after a transaction has been performed on the terminal. For example, if the peripheral device is a card reader, a card may be presented at the entry to the card reader and then removed after a transaction has been processed. This may trigger capture of the comparison image. Presentation of the card without full insertion into the card reader may also trigger capture of a comparison image. Alternatively, a comparison image may be captured without a transaction taking place such as at predefined intervals or random intervals. The comparison image capture may occur by the imaging device recording a video for a preset amount of time, for example 8 seconds. The brightness of each individual frame during the video may be calculated to find a frame with a brightness level within a preset range of brightness levels, for example a range of 110 to 130 brightness. The first frame found during the video with a brightness within the preset range of brightness levels may be the image frame selected to use. The comparison image used may be the selected image frame with the brightness level of the selected image frame adjusted to the common brightness level, for example a brightness level of 120.

In a fourth step 1140, a percentage of change is calculated between the comparison image and the baseline image and stored. That is, an overall percentage change taking into account all pixels of the baseline image and the comparison image is calculated and stored in memory.

In a fifth step 1150, the comparison image is compared with the baseline image to determine whether a foreign object is present in the peripheral device. This may be achieved utilising the process described in FIG. 10 from steps 1040-1084. Upon determining that no foreign object is present, the comparison image is used as the new baseline image (as in step 1071).

In a sixth step 1160, at least one further comparison image of the internal region is captured. The further comparison image may be captured in the same way as described with respect to step 1130.

In a seventh step 1170, for each further comparison image that is captured, if it is also determined that no foreign object is present (using steps 1040-1084), a percentage of change is calculated between the respective further comparison image and the respective previous baseline image that the respective comparison image is being compared to when checking if a foreign object is present. These further percentages of change are also stored in memory.

In an eighth step 1180, a consecutive number of percentage of change values for consecutive comparison images is analysed. For example, the percentage of change is analysed over a predetermined number of transactions, such as the last 5 transactions (where a comparison image is captured after each transaction).

If the percentage of change for each of the predetermined number of transactions in step 1180 is above a predefined value, then in a ninth step 1190 a determination is made that the imaging device is within the active peripheral device. For example, the predefined value of percentage of change may be zero. The predefined value may alternatively be 0.5 or 1. The process then repeats from step 1160 when another further comparison image is captured by the imaging device.

If the percentage of change for each of the predetermined number of transactions in step 1180 is less than a predefined value, then in step 1195 a determination is made that the imaging device is within a dummy peripheral device. For example, the predefined value of percentage of change may be zero. The predefined value may alternatively be 0.5 or 1.

Subsequent to determining that the imaging device is within a dummy peripheral device in step 1195, in step 1196 an alert is issued that the imaging device is within a dummy peripheral device and the transaction terminal is placed into an out of service state.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

What is claimed is:

1. A computer-implemented method for determining that an imaging device for a peripheral device of a transaction terminal is in a dummy peripheral device to prevent detection of a foreign object in an active peripheral device of the transaction terminal, comprising the steps of:

capturing, by an imaging device, a first image of an internal region of an apparent peripheral device of the transaction terminal;

calculating, by a processor of a transaction terminal, a first amount of change between the first image and a baseline image of the internal region;

capturing, by the imaging device, at least one further image of the internal region;

for each further image, calculating, by the processor, a second amount of change between the further image and a respective baseline image of the internal region; and when at least two consecutive values of at least one of the first and second amount of change are below a predefined value, determining that the imaging device is in a dummy peripheral device to prevent detection of a foreign object in an active peripheral device of the transaction terminal.

2. The method as claimed in claim 1, further comprising:

determining, by the processor, that the imaging device is in the dummy peripheral device when at least two consecutive values of at least one of the first and second amount of change are zero.

3. The method as claimed in claim 1, further comprising:

calculating, by the processor, the first amount of change as an overall percentage change between the first image and the baseline image; and calculating, by the processor, the second amount of change as an overall percentage change between each further image and each respective baseline image.

4. The method as claimed in claim 1, further comprising:

determining, by the processor, that the imaging device is in the dummy peripheral device when at least five consecutive values of at least one of the first and second amount of change are below the predefined value.

5. The method as claimed in claim 1, further comprising:

after capturing the first image, determining, by the processor, that the foreign object is not present in the first image by comparing the first image with the baseline image.

6. The method as claimed in claim 1, further comprising:

after capturing each further image, determining, by the processor, that the foreign object is not present in the further image by comparing the further image with the respective baseline image.

7. The method as claimed in claim 5, whereby comparing comprises:

calculating, by the processor, a difference between first pixel values associated with pixels of said first image and second pixel values associated with corresponding pixels of the baseline image, thereby obtaining a plurality of difference values; and after calculating said difference, calculating, by the processor, a first preset value of two preset values for difference values of the plurality of difference values that exceed the first predetermined threshold.

8. The method as claimed in claim 7, whereby determining that the foreign object is not present in the first or further image comprises:

determining that the foreign object is not present in the first or further image when less than a predefined amount of the first preset value exceeds a second predetermined threshold in at least one region of interest associated with the internal region.

9. The method as claimed in claim 8, further comprising:

determining that the foreign object is not present in the first or further image when a predefined percentage of the first preset value does not exceed the second predetermined threshold in the at least one region of interest.

10. The method as claimed in claim 7, further comprising:

calculating said first preset value by applying, by the processor, a thresholding algorithm to the plurality of difference values.

11. The method as claimed in claim 7, further comprising:

calculating said difference to obtain the plurality of difference values by subtracting, by the processor, all pixel values associated with the pixels of the first image from all corresponding pixel values associated with the pixels of the baseline image, or vice versa.

12. The method as claimed in claim 7, further comprising:

generating, by the processor, a difference image comprising pixels each having a pixel value equal to one of the plurality of difference values.

13. The method as claimed in claim 7, further comprising:

generating, by the processor, a threshold image comprising pixels having values equal to the first preset value and pixels having values equal to a second preset value of the two preset values, the second preset value representing difference values of the plurality of difference values that do not exceed the first predetermined threshold.

14. The method as claimed in claim 1, further comprising:

capturing, by the imaging device, said first image and each further image after a transaction has been conducted on the transaction terminal.

15. The method as claimed in claim 1, further comprising:

capturing, by the imaging device, an original baseline image with the imaging device during startup of the active peripheral device on the transaction terminal; and when the foreign object is not determined as being present in the first image, replacing the original baseline image with said first image, thereby providing an updated baseline image.

16. The method as claimed in claim 15, further comprising:

for each further image, when the foreign object is not determined as being present in the further image, replacing the updated baseline image with the further image.

17. The method as claimed in claim 1, further comprising:

responsive to determining that the imaging device is in the dummy peripheral device, issuing, by the processor, an alert.

18. The method as claimed in claim 1, whereby the active peripheral device is a card reader and the foreign object is a card skimming device.

19. A transaction terminal, comprising:

an imaging device configured to capture images of an internal region of a peripheral device; and at least one processor comprised within or communicatively coupled to the peripheral device and coupled to the imaging device to receive the captured images, the processor configured to:

calculate a first amount of change between a first image of an internal region of an apparent peripheral device captured by the imaging device and received from the imaging device and a baseline image of the internal region;

for each further image captured of the internal region by the imaging device and received from the imaging device, calculate a second amount of change between the further image and a respective baseline image of the internal region; and determine that the imaging device is in a dummy peripheral device to prevent detection of a foreign object in an active peripheral device of the transaction terminal when at least two consecutive values of at least one of the first and second amount of change are below a predefined value.

* * * * *